US012065864B2

(12) United States Patent
Savant et al.

(10) Patent No.: US 12,065,864 B2
(45) Date of Patent: Aug. 20, 2024

(54) DOOR LEAF ASSEMBLY WITH ELECTRIC UNLOCKING SYSTEM

(71) Applicant: U-Shin Italia S.p.A., Pianezza (IT)

(72) Inventors: Marco Savant, Pianezza (IT); Antonino Cannavo, Pianezza (IT)

(73) Assignee: U-SHIN ITALIA S.P.A., Pianezza (IT)

( * ) Notice: Subject to any disclaimer, the term of this patent is extended or adjusted under 35 U.S.C. 154(b) by 396 days.

(21) Appl. No.: 17/130,858

(22) Filed: Dec. 22, 2020

(65) Prior Publication Data

US 2021/0108450 A1 Apr. 15, 2021

Related U.S. Application Data

(63) Continuation of application No. PCT/EP2019/066461, filed on Jun. 21, 2019.

(30) Foreign Application Priority Data

Jun. 22, 2018 (FR) ...................................... 18/55557

(51) Int. Cl.

| | |
|---|---|
| ***E05B 81/76*** | (2014.01) |
| ***E05B 77/04*** | (2014.01) |
| ***E05B 85/10*** | (2014.01) |

(52) U.S. Cl.

CPC ............ *E05B 85/103* (2013.01); *E05B 77/04* (2013.01); *E05B 81/76* (2013.01); *E05B 81/77* (2013.01);

(Continued)

(58) Field of Classification Search

CPC ........ E05B 81/76; E05B 81/77; E05B 85/103; E05B 85/107; E05B 85/16; Y10S 292/31

See application file for complete search history.

(56) References Cited

U.S. PATENT DOCUMENTS

| | | | | |
|---|---|---|---|---|
| 6,367,295 B1 | 4/2002 | Agostini et al. | | |
| 7,777,141 B2 * | 8/2010 | Ishiguro | E05B 81/76 200/341 | |

(Continued)

FOREIGN PATENT DOCUMENTS

| | | |
|---|---|---|
| CN | 107849875 | 3/2018 |
| CN | 107939186 | 4/2018 |

(Continued)

OTHER PUBLICATIONS

International Search Report for International Application PCT/EP2019/066461, mailed Jul. 12, 2019.

(Continued)

*Primary Examiner* — Carlos Lugo

(74) *Attorney, Agent, or Firm* — Burris Law, PLLC

(57) ABSTRACT

A door handle assembly and unlocking method include a handle connected to a base by a hinge for rotation between an idle position, substantially parallel to the base, and a door-opening position, inclined relative to the base. An actuator is within the base and moves the handle to at least the opening position. A first control device in the handle and connected to an electric unlocking system. The handle includes a tactile area on an inner surface for receiving pressure applied by the user's hand for activating the first control device and generating a first control signal. A second control device is on the base and is actuated by movement of the handle from the opening position to an over-opening (Continued)

position to generate a second control signal. The electric unlocking system receives the first or second control signal in order to unlock and allow opening of the door.

6 Claims, 4 Drawing Sheets

(52) U.S. Cl.
CPC ....... *E05B 85/107* (2013.01); *E05Y 2400/445* (2013.01)

(56) References Cited

U.S. PATENT DOCUMENTS

| | | | | |
|---|---|---|---|---|
| 7,938,460 | B2 * | 5/2011 | Ishiguro | E05B 81/76 292/336.3 |
| 8,505,241 | B2 * | 8/2013 | Kusunoki | E05F 15/646 296/146.4 |
| 8,601,903 | B1 * | 12/2013 | Klein | E05B 81/78 74/543 |
| 8,701,353 | B2 | 4/2014 | Patel et al. | |
| 8,757,686 | B2 * | 6/2014 | Ishida | E05B 85/16 292/357 |
| 8,943,752 | B2 * | 2/2015 | Thomas | E05B 85/103 49/394 |
| 10,787,855 | B2 * | 9/2020 | Nakatomi | E05F 15/75 |
| 2014/0000167 | A1 | 1/2014 | Patel et al. | |
| 2014/0246873 | A1 * | 9/2014 | Raulin | E05B 81/78 292/336.3 |
| 2016/0222702 | A1 | 8/2016 | Koizumi et al. | |

FOREIGN PATENT DOCUMENTS

| | | | | |
|---|---|---|---|---|
| DE | 19856902 | A1 * | 6/2000 | B29C 45/1676 |
| DE | 10340792 | A1 * | 4/2005 | E05B 85/107 |
| DE | 102006027473 | | 12/2007 | |
| DE | 102015010923 | A1 * | 3/2016 | B60Q 1/00 |
| DE | 102016002070 | A1 * | 8/2017 | |
| EP | 1067257 | A1 * | 1/2001 | E05B 85/16 |
| WO | WO-9928170 | A1 * | 6/1999 | E05B 85/10 |
| WO | 2004079137 | | 9/2004 | |
| WO | 2017077077 | | 5/2017 | |

OTHER PUBLICATIONS

Office Action issued in corresponding JP Application 2020-571463, issued Apr. 4, 2023, and an English Translation, 10 pages.

* cited by examiner

DOOR LEAF ASSEMBLY WITH ELECTRIC UNLOCKING SYSTEM

CROSS-REFERENCE TO RELATED APPLICATIONS

This application is a continuation of International Application No. PCT/EP2019/066461, filed on Jun. 21, 2019, which claims priority to and the benefit of FR 18/55557, filed on Jun. 22, 2018. The disclosures of the above applications are incorporated herein by reference.

FIELD

The present disclosure relates to a door leaf handle assembly for a vehicle and a method for unlocking a door leaf handle assembly.

BACKGROUND

The statements in this section merely provide background information related to the present disclosure and may not constitute prior art.

Some luxury vehicles are equipped with a handle embedded in the vehicle's door. These handles allow obtaining an improved aesthetic effect because they merge with the rest of the door. Such handles can be very discreet.

These embedded handle assemblies are available in both mechanical and motorized versions.

Door leaf handle assemblies conventionally include a base configured to be fixed on the door and a handle connected to the base by a hinge. The hinge can be horizontal or, more commonly, can be vertical.

The handle is movable in rotation relative to the base between a rest position in which the handle is positioned substantially parallel to the base and embedded in the door, and an opening position of the door in which it is inclined with respect to the base and therefore deployed.

The door leaf handle assemblies also include a device for actuating the handle housed in the base, allowing to bring it to the opening position.

In the case of an electric door leaf handle assembly, as described in U.S. Pat. No. 8,701,353, the actuating device includes a motor driving the handle via gears to bring it to the opening position.

From this position, the user can pull on the handle to bring it to an over-opening position in which the handle is more inclined relative to the base, allowing to unlock a mechanical unlocking system to open the door.

Conventional unlocking systems are housed in the door and are connected to the door leaf handle assembly by a cable. The actuation of the handle exerts a traction on the cable which in turn actuates the unlocking of the unlocking system.

The user can then pull on the door to open it.

However, this type of mechanical unlocking system may unlock itself in the event of an accident due to the displacement by inertia of its components which have a non-zero weight.

U.S. Pat. No. 8,701,353 describes another solution in which the unlocking system is electronic. A pressure provided on a capacitive sensor disposed on the handle allows unlocking of the unlocking system.

This makes it possible to avoid accidental unlocking and therefore unwanted opening of the door during an accident.

However, the capacitive sensors may not always be reliable. For example, the capacitive sensors do not always detect the presence of a user's fingers, especially if the fingers are covered by a textile material such as gloves. In such a circumstance, the unlocking system cannot, therefore, be unlocked and the user cannot open the door.

SUMMARY

This section provides a general summary of the disclosure and is not a comprehensive disclosure of its full scope or all of its features.

The teachings of the present disclosure aim to resolve all or part of these drawbacks by proposing a door leaf handle assembly for a vehicle and a method for unlocking this door leaf handle assembly making it possible to make the opening of the door more reliable.

The present disclosure concerns a door leaf handle assembly configured to be mounted on a door of a motor vehicle. The door leaf handle assembly includes:

a base configured to be fixed on the door, a handle connected to the base by a hinge at a first end of the handle, the handle being movable in rotation with respect to the base between a rest position in which it is positioned substantially parallel to the base, and an opening position of the door in which it is inclined relative to the base, and a device for actuating the handle housed in the base, configured to provide a movement to the handle to at least bring it into the opening position.

According to the teachings of the present disclosure, the door leaf handle assembly includes:

a first device for controlling the opening of the door integrated in the handle and connected to an electric unlocking system, the handle including a touch zone on an inner surface configured to receive a pressure from the hand of a user to activate the first control device and generate a first control signal, a second control device positioned on the base, the second control device being actuated by a displacement of the handle from the opening position to an over-opening position to generate a second control signal, the electric unlocking system receiving the first control signal or the second control signal in order to be unlocked and allow the opening of the door by the user.

In one form, the first control device and the second control device are each connected to the electric unlocking system by a respective electrical connection.

The first control device and/or the second control device may include a distinct switch connected to their respective electrical connection. The switch includes an element movable between a rest position and an activated position obtained when the user presses on the touch zone of the handle or displaces the handle to the over-opening position. A control signal is transmitted from the switch to the electric unlocking system.

In one form, the touch zone is movable so that a pressure on the touch zone causes a displacement of the movable element in the activated position.

The first control device and/or the second control device can include a deformable membrane forming the touch zone.

Advantageously, the control device and/or the second control device include a cap movable in translation and on which the touch zone is formed. The displacement of the cap against the movable element causes the displacement of the latter and the generation of the control signal. The control device and/or the second control device include a return means exerting a force on the cap to return it to the initial position.

The present disclosure also concerns a method for unlocking a door leaf handle assembly as defined above and including a step of positioning the handle in the opening position by the actuating device.

According to one form, the method includes the following steps:

- activating a first control device carried out by pressing a hand of a user on a touch zone provided on an inner surface of the handle to activate the first control device and generate a first control signal,
- if the first control signal is not transmitted to the electric unlocking system, activating a second control device positioned on the base by displacing the handle from the opening position to an over-opening position to generate a second control signal,
- and transmitting the second control signal to an electric unlocking system to unlock it in order to authorize the opening of the door by the user.

The present disclosure thus provides a door leaf handle assembly for a vehicle and a method for unlocking this door leaf handle assembly making it possible to make the opening of the door more reliable.

The electric unlocking system can be unlocked even when the handle sensor has failed.

In addition, the elements of the door leaf handle assembly are lightweight and therefore difficult to move under the acceleration created during an accident.

This door leaf handle assembly also makes it possible to simplify the mounting or the maintenance because the assembly of the lock can be done from the outside and after the mounting of the handle. It is not necessary to remove the interior trim panel of the door to dismantle the handle when the vehicle is finished.

It is also possible to integrate an antenna or a lighting system in the base.

The use of a wired connection unlike a wireless connection allows simplifying the electronics and avoids having a power source in the handle. The handle is also lightened.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 4:
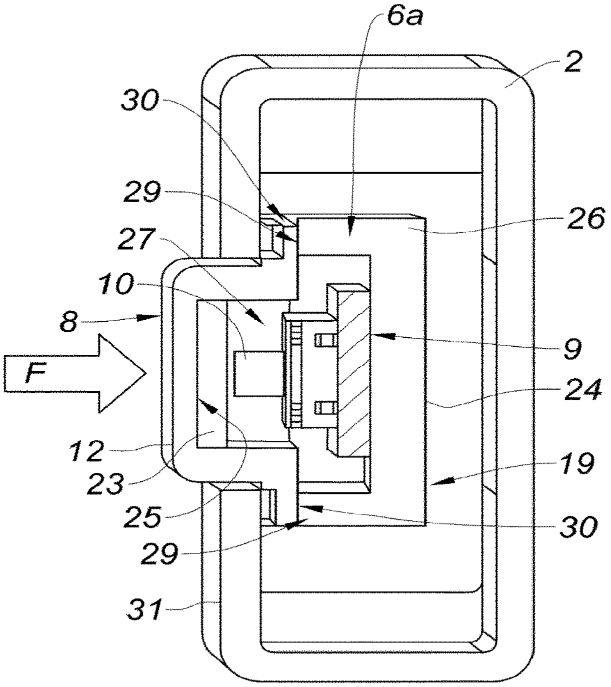
FIG. 4 is a cross-sectional view of a portion of the handle assembly of FIG. 1, illustrating a first device for controlling the opening of the door in a handle according to a first configuration in accordance with the teachings of the present disclosure.
Figure 6:
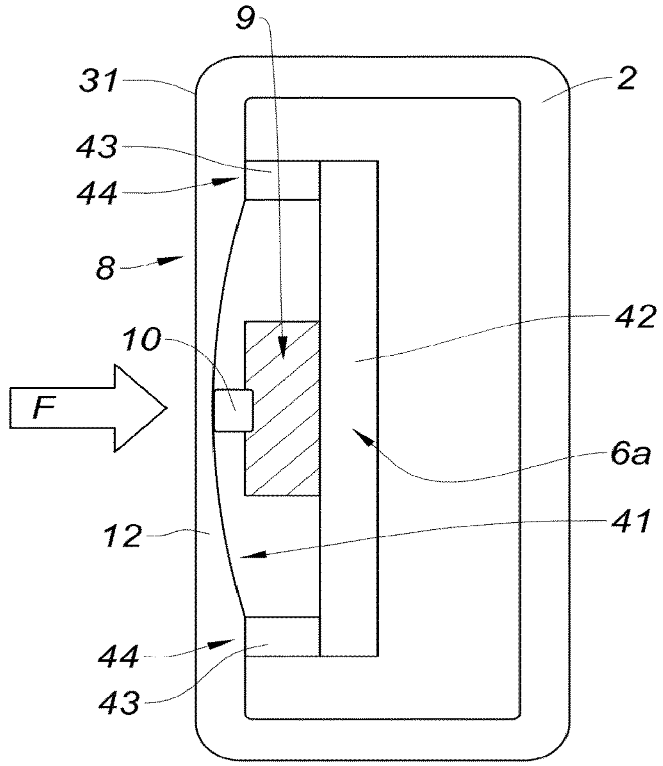
Figure 7:
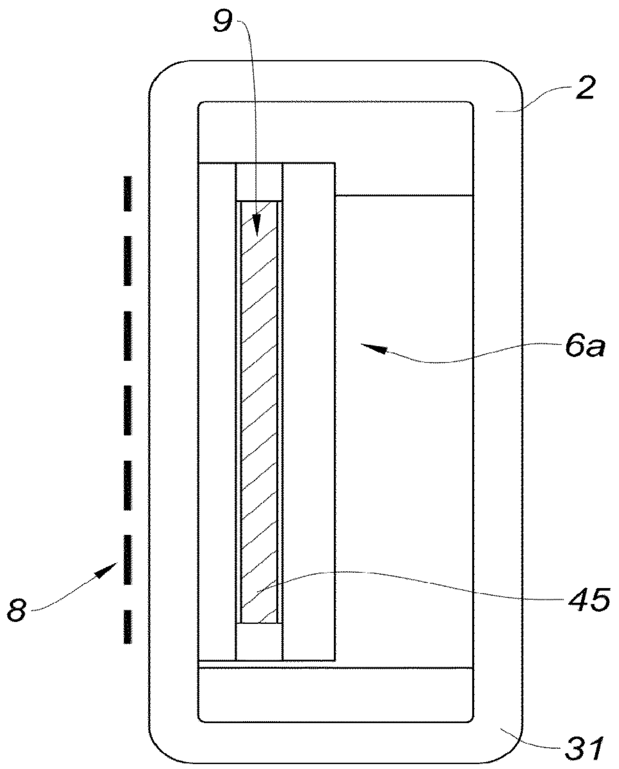

FIG. 6 is a cross-sectional view similar to FIG. 4, illustrating a first device for controlling the opening of the door in a handle according to a third configuration in accordance with the teachings of the present disclosure; and FIG. 7 is a cross-sectional view similar to FIG. 4, illustrating a first device for controlling the opening of the door in a handle according to a fourth configuration in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
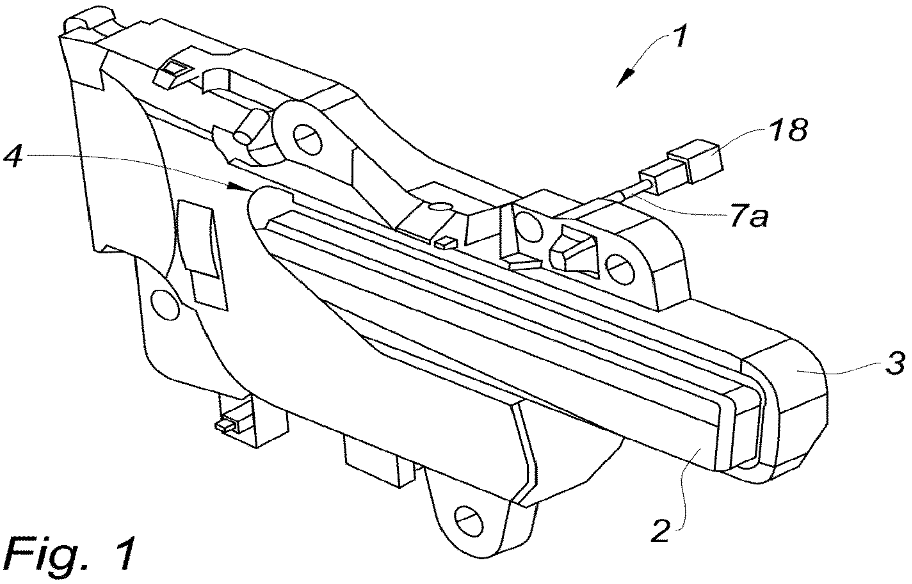
FIG. 1 is a front perspective view of a door leaf handle assembly according to the teachings of the present disclosure, illustrating the handle in a rest position.

Referring to FIG. 1, an example of a door leaf handle assembly 1 configured to be mounted on a door (not shown) of a motor vehicle (not shown) is illustrated with the handle 2 in a rest position.

Figure 2:
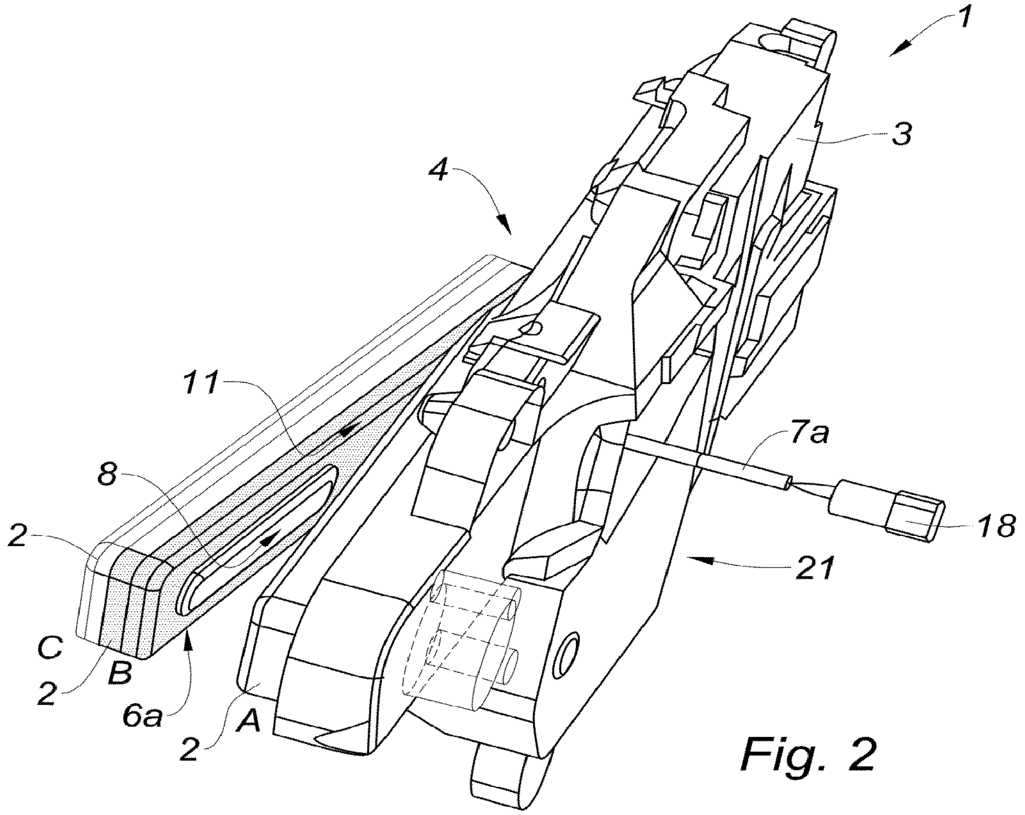
FIG. 2 is a side perspective view of the door leaf handle assembly of FIG. 1, illustrating the handle in the rest position, in an opening position, and in an over-opening position.

With reference to FIGS. 1 and 2, the door leaf handle assembly 1 includes a base 3 configured to be fixed on the vehicle door and a handle 2 connected to the base 3 by a hinge (not represented) at a first end 4 of the handle 2.

In one configuration, the hinge is vertical, though other configurations can be used.

The base 3 is configured to be fixed on the inner wall of the door.

The handle 2 is movable in rotation relative to the base 3 between a rest position in which it is positioned substantially parallel to the base 3 and an opening position of the door in which it is inclined relative to the base 3.

The rest position also corresponds to the closed position of the handle 2 in which the handle 2 is retracted towards the door.

As for the opening position, it corresponds to the position in which the handle 2 is deployed to be gripped by the user when the user wants to pull on the door to open it.

The door leaf handle assembly 1 includes a device for actuating (shown in FIG. 3; i.e., an actuator 5, also referred to herein as the actuating device 5) the handle 2 housed in the base 3 and which is configured to move the handle 2 to at least bring the handle 2 to the opening position.

In one configuration, the actuating device 5 includes a motor (not specifically shown) cooperating with gears (not specifically shown) to provide a motorized movement to the handle 2 to bring the handle 2 at least to the opening position.

The motor can also allow closing or retracting the handle 2 towards the base 3 (or the door).

Alternatively, the actuating device 5 can be mechanically actuated to obtain a deployed position, such as a system provided with a spring mechanism as described in the application WO2017077077, which is commonly assigned and incorporated herein by reference.

In the example provided, the door leaf handle assembly 1 includes a first device **6*a*** for controlling the opening of the door.

The first control device **6*a* is connected to an electric unlocking system (not represented) by an electrical connection 7*a* (e.g., a wired connection), also called the first electrical connection 7*a***.

The first control device 6a is configured to be activated by the hand of a user and to generate a control signal which is configured to be transmitted to the electric unlocking system to unlock it in order to allow the opening of the door by the user.

Figure 3:
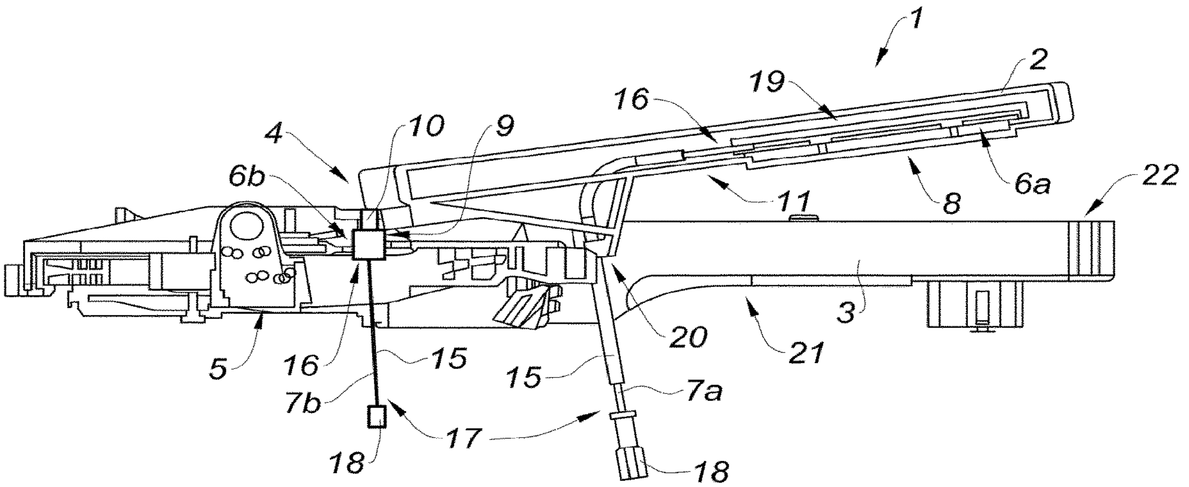
FIG. 3 is a top view of the door leaf handle assembly of FIG. 1, illustrated in the opening position.

With additional reference to FIG. 3, the electrical connection 7a includes an electrical cable 15 having a first end 16 connected to the first control device 6a and a second end 17 including a connector 18 configured to be connected to the electric unlocking system.

The first control device 6a is integrated in the handle 2.

The first control device 6a is housed in a cavity 19 provided in the handle 2.

The electrical connection 7a starts from the first control device 6a, passes through a portion of the handle 2 and emerges therefrom via an opening 20, as represented in FIG. 3.

The electrical connection 7a then passes through the base 3 to emerge via a first face 21 of the base 3.

The handle 2 includes a touch zone 8 on its inner surface 11 configured to receive a pressure to activate the first control device 6a.

In the example provided, the handle 2 has a parallelepipedal shape.

In one form, the inner surface 11 is positioned facing the base 3 and more precisely facing a second face 22 of the base 3.

In the rest position, the touch zone 8 of the handle 2 is positioned against or is very close to this second face 22.

The advantage is that the touch zone 8 is protected from the outside. It is also hidden to improve the aesthetic effect.

The first control device 6a includes a switch 9, as represented in FIGS. 4 to 7, which is connected to the electrical connection 7a.

Figure 5:
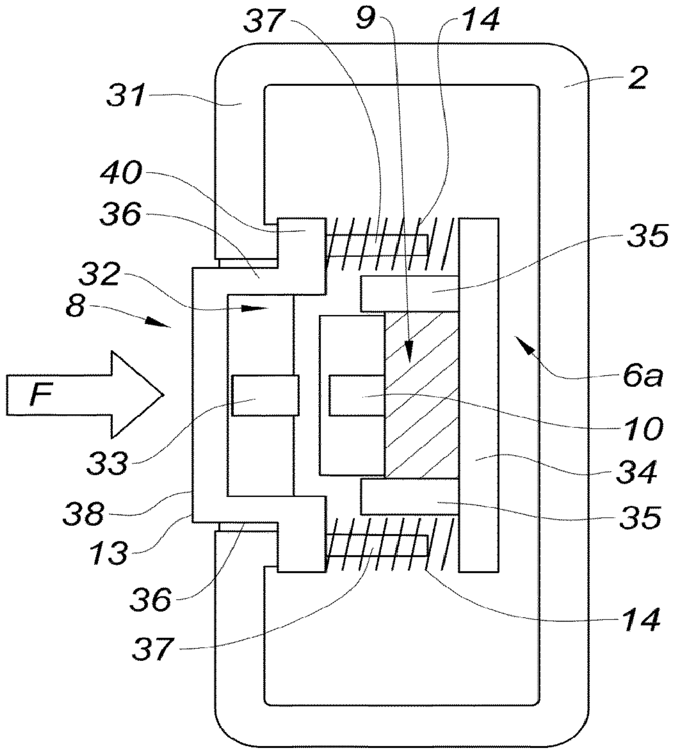
FIG. 5 is a cross-sectional view similar to FIG. 4, illustrating a first device for controlling the opening of the door in a handle according to a second configuration in accordance with the teachings of the present disclosure.

In the examples of FIGS. 4 to 6, the switch 9 includes a movable element 10 that is movable between a rest position and an activated position obtained when the user presses the touch zone 8 of the handle 2.

The movable element 10 is for example a push button which returns to the initial position by means of a spring.

A control signal is then transmitted from the switch 9 towards the electric unlocking system so that it unlocks and leaves the door free of any movement so that it can be opened by a user.

The touch zone 8 can be movable so that a pressure on the touch zone 8 causes the displacement of the movable element 10 in the activated position.

FIG. 4 shows a first example configuration in which the first control device 6a includes a deformable membrane 12 forming the touch zone 8.

The deformable membrane 12 may be made of polymer.

Once the handle 2 is in the opening position, the user exerts a pressure on the deformable membrane 12 in a direction F.

The deformable membrane 12 is deformed to push the movable element 10 and activate the switch 9, that is to say to switch it to the "ON" position.

The switch 9 can be connected to an open electrical circuit which is closed when the switch 9 is pressed, for example.

In the example provided, the deformable membrane 12 has a generally U-shaped cross-section defining a cavity 27 and covers the movable element 10 which is positioned in the cavity 27.

The switch 9 may include a rigid plate 23 positioned against an inner surface 25 of the cavity 27 of the deformable membrane 12.

This plate 23 can come into contact with the movable element 10.

The switch 9 is positioned on a U-shaped support 26 including two ends 29.

The deformable membrane 12 includes two ends 30 resting on the two respective ends 29 of the support 26.

Thus, the deformable membrane 12 is deformed when the user exerts pressure on it and returns to its initial position when the pressure is stopped.

The two ends 30 of the deformable membrane 12 are retained between the two ends 29 of the support 26 and a peripheral wall 31 of the handle 2.

Referring to FIG. 5, a second example configuration is illustrated in which the first control device 6a includes a cap 13 movable in translation on which the touch zone 8 is formed.

The cap 13 is rigid and has a "U" shape defining a cavity 32. The cap 13 is positioned facing the movable element 10.

The cap 13 includes a front wall 38, forming the touch zone 8, connected perpendicularly to two lateral walls 36 defining a cavity 32.

The cap 13 advantageously includes a lug 33 on its front wall 38 positioned facing the movable element 10 to reduce its stroke.

The displacement of the cap 13 against the movable element 10 in the direction F causes the displacement of the latter and the generation of the control signal.

The switch 9 is positioned on a U-shaped support 34 including two flanges 35.

The two lateral walls 36 of the switch 9 are each extended by a flange 40 perpendicular to the lateral walls 36.

Each flange 40 is extended by a lateral lug 37 which abuts against the support 34 when the user exerts a pressure on the movable element 10 in the direction F. The lateral lug 37 is substantially perpendicular to the flanges 40.

The first control device 6a includes a return means 14 exerting a return force on the cap 13 to return it to the initial position.

In the example provided, each lateral lug 37 is surrounded by a spring 14, forming the return means 14.

Referring to FIG. 6, a third example configuration is illustrated in which the first control device 6a also includes a deformable membrane 12 forming the touch zone 8.

The peripheral wall 31 of the handle 2 is covered by the deformable membrane 12.

In the example provided, the deformable membrane 12 has a smaller thickness at the location of the touch zone 8 so as to form a curved inner zone 41.

The first control device 6a includes a support 42 on which the switch 9 is mounted.

The support 42 includes two lateral flanges 43 forming bearing zones 44 for the deformable membrane 12.

The movable element 10 is in permanent contact with the curved inner zone 41.

Only the curved inner zone 41 is deformed when the user exerts a pressure on the touch zone 8 in the direction F. It is slightly deformed under the action of the pressure of the finger.

The stroke and the deformation of the deformable membrane 12 is minimal, of a few micrometers for example.

Referring to FIG. 7, a fourth example configuration is illustrated in which the first control device 6a includes a touch detector 45. In the example provided, the touch detector 45 is a capacitive sensor integrated into the handle 2, though other types of sensors or configurations can be used. In one alternative configuration, the touch detector 45 can be integrated by overmolding.

The touch detector 45 may alternatively be a piezoelectric sensor integrated into the handle 2.

The activation of the first control device 6*a* is carried out by pressing on a touch zone 8 provided on the inner surface 11 of the handle 2, the handle 2 remaining stationary in its opening position during this activation.

Referring to FIG. 3, the door leaf handle assembly 1 includes a second control device 6*b* positioned on the base 3.

The second control device 6*b* is actuated by a displacement of the handle 2 from the opening position towards an over-opening position to generate a second control signal.

The over-opening position corresponds to a position in which the handle 2 is more inclined relative to the base 3 and relative to the opening position.

In other words, the angle formed between the handle 2 and the base 3 is greater in the over-opening position than in the opening position.

The second control device 6*b* is advantageously positioned near the first end 4 of the handle 2.

The second control device 6*b* can be identical to the first control device 6*a*.

In one form, the second control device 6*b* includes a switch 9 connected to another electrical connection 7*b*, called the second electrical connection 7*b*.

The switch 9 includes a movable element 10 between a rest position and an activated position obtained when the user brings the handle 2 to the over-opening position.

A second control signal is then transmitted from the switch 9 to the electric unlocking system.

When the handle 2 is in its opening position, the user pulls more on it and towards him/her to bring the handle 2 into the over-opening position.

The rotational movement of the handle 2 towards the over-opening position causes a pressure from the first end 4 of the handle 2 on the movable element 10 of the switch 9 to switch it and transmit the second control signal to the electric unlocking system.

The electrical connection 7*b* includes an electrical cable 15 having a first end 16 connected to the second control device 6*b* and a second end 17 including a connector 18 configured to be connected to the electric unlocking system.

Thus, the door leaf handle assembly 1 includes two control devices 6*a*, 6*b* whose first control device 6*a* positioned in the handle 2 and the second control device 6*b* positioned on the base 3.

One example method for unlocking the door leaf handle assembly 1 includes the following steps:

activating the first control device 6*a* in response to the hand of a user pressing on a touch zone 8 provided on an inner surface 11 of the handle 2 to activate the first control device 6*a* and generate the first control signal, if the first control signal is not transmitted to the electric unlocking system, activating the second control device 6*b* positioned on the base 3 by displacing the handle 2 from the opening position towards the over-opening position to generate the second control signal, and transmitting the second control signal to the electric unlocking system to unlock it in order to authorize the opening of the door by the user.

Consequently, if the first control device 6*a* is failed, the second control device 6*b* takes over so that the unlocking of the electric unlocking system is ensured.

This is particularly advantageous when the first control device 6*a* includes a capacitive sensor which does not detect the user fingers each time.

If the capacitive sensor of the first control device 6*a* does not work, the user pulls on the handle 2 to bring it into the over-opening position, then triggering the second control device 6*b*.

The electric unlocking system thus receives either the first control signal or the second control signal in order to unlock it and allow the door to be opened by the user.

The handle 2 may include a spring returning it from the over-opening position to the rest position.

A counterweight can be provided in the handle 2 or the base 3 to optimize inertial balancing with the handle spring 14.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A door leaf handle assembly configured to be mounted on a door of a motor vehicle, the door leaf handle assembly comprising:

a base configured to be fixed on the door;

a handle connected to the base by a hinge at a first end of the handle, the handle being movable in rotation relative to the base between a rest position in which the handle is positioned substantially parallel to the base, and an opening position of the door in which the handle is inclined relative to the base;

an actuator housed in the base, configured to move the handle at least into the opening position;

a first control device configured to open the door, the first control device being integrated in the handle and connected to an electric unlocking system, the handle including a touch zone on an inner surface configured to receive a pressure from a hand of a user to activate the first control device and generate a first control signal; and a second control device positioned on the base, the second control device being actuated by a movement of the handle from the opening position to an over-opening position to generate a second control signal, the electric unlocking system being configured to receive the first control signal or, if the first control signal is not transmitted to the electric unlocking system, the second control signal in order to unlock and allow opening of the door by the user, wherein the first control device and the second control device are each connected to the electric unlocking system by a distinct electrical connection.

2. The door leaf handle assembly according to claim 1, wherein the first control device, the second control device, or both the first control device and the second control device include a distinct switch, connected to a respective electrical connection, the switch including a movable element that is movable between a rest position and an activated position obtained when the user presses the touch zone of the handle or displaces the handle to the over-opening position, wherein a control signal is transmitted from the switch towards the electric unlocking system.

3. The door leaf handle assembly according to claim 2, wherein the touch zone is movable so that a pressure on the touch zone causes a displacement of the movable element in the activated position.

4. The door leaf handle assembly according to claim 3, wherein the first control device, the second control device, or both the first control device and the second control device include a deformable membrane forming the touch zone.

5. The door leaf handle assembly according to claim 4, wherein the first control device, the second control device, or both the first control device and the second control device include a cap movable in translation and on which the touch zone is formed, wherein displacement of the cap against the movable element causes displacement of the movable element and generation of the control signal, wherein the first control device, the second control device, or both the first control device and the second control device include a return means exerting a force on the cap to return it to an initial position.

6. A method for unlocking a door leaf handle assembly including a base configured to be fixed on a door, a handle connected to the base by a hinge at a first end of the handle, the handle being movable in rotation with respect to the base between a rest position in which the handle is positioned substantially parallel to the base, and an opening position of the door in which the handle is inclined relative to the base, the method comprising:

positioning the handle in the opening position by an actuator of the handle housed in the base;

activating a first control device carried out by pressing a hand of a user on a touch zone provided on an inner surface of the handle to activate the first control device and generate a first control signal;

activating a second control device positioned on the base by moving the handle from the opening position towards an over-opening position to generate a second control signal if the first control signal is not transmitted to the electric unlocking system, wherein the first control device and the second control device are each connected to the electric unlocking system by a distinct electrical connection; and transmitting the second control signal to an electric unlocking system to unlock it in order to authorize opening of the door by the user.

* * * * *